[11] 3,587,299

- [72] Inventor James J. Fol
  Westboro, N
- [21] Appl. No. 616,662
- [22] Filed Feb. 16, 1967
- [45] Patented June 28, 1971
- [73] Assignee Whittaker Corporation, Los Angeles, Calif.

[54] MEANS AND METHOD FOR SENSING CHAR LAYERS
9 Claims, 4 Drawing Figs.

- [52] U.S. Cl. .................................................. 73/67.7, 73/86
- [51] Int. Cl. .................................................. G01n 17/00
- [50] Field of Search ...................................... 73/67.7, 67.8, 67, 86, 87

[56] References Cited
UNITED STATES PATENTS

| | | | |
|---|---|---|---|
| 3,056,284 | 10/1962 | Marsh et al. | 73/86 |
| 3,253,219 | 5/1966 | Littler | 73/86X |
| 3,329,022 | 7/1967 | Feldman | 73/86X |
| ...... | ...... | et al. | 73/86 |
| ...... | ...... | al. | 73/86 |
| 3,357,231 | 12/1967 | Le Bel | 73/86 |
| 3,367,175 | 2/1968 | Morreal et al. | 73/86 |

*Primary Examiner*—Charles A. Ruehl
*Assistant Examiner*—John R. Flanagan
*Attorney*—Donald E. Nist ABSTRACT: A means and method for char rate detection in ablative materials are provided. In accordance with the invention, sound wave reflectors are embedded at predetermined depths between two opposing surfaces of virgin ablative material. A sound generator is positioned adjacent one surface to send ultrasonic sound waves toward the second surface which is exposed to charring conditions. The generator is coupled with a sensor and senses return of sound waves so that the depth of char and rate of char can be determined, since as the char front moves past each reflector, the resulting layer of porous, charred ablative material prevents reflection of sound waves from reflectors lying beyond the char front in the charred layer of the material.

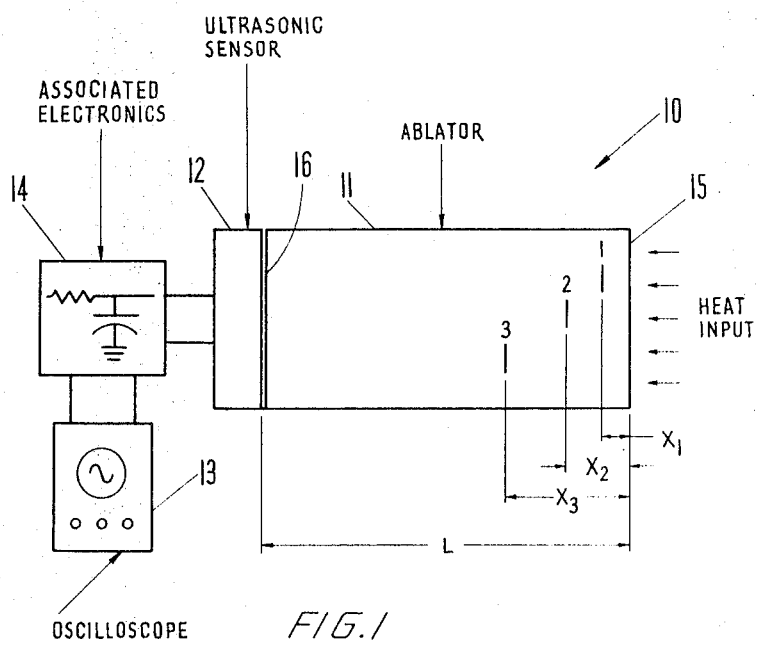
FIG./
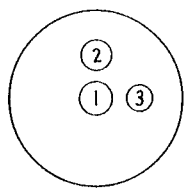
FIG.2
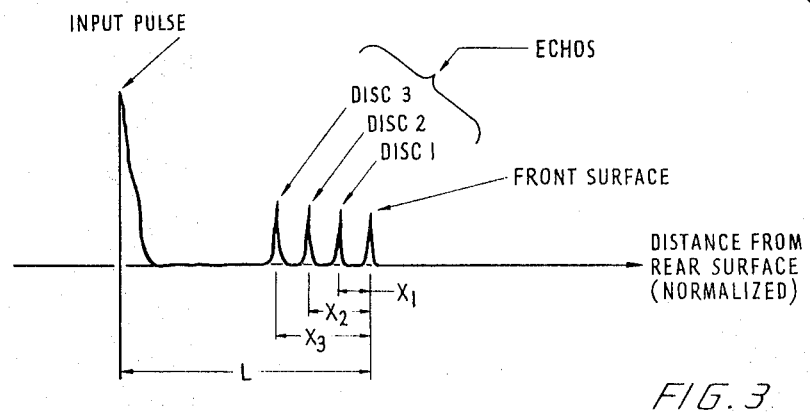
FIG.3
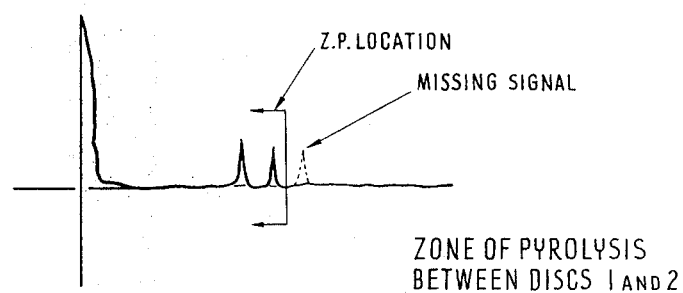
FIG.3a
INVENTOR
James J. Foley
BY
Wolf, Greenfield & Hieken

3,587,299

MEANS AND METHOD FOR SENSING CHAR LAYERS

BACKGROUND OF THE INVENTION

1. Field of the Invention

The measurement of char layers in virgin ablative materials has become extremely important in recent years. Ablative materials are frequently used as heat shields for space reentry vehicles, ballistic weapons and as rocket nozzle liners as well as many other applications. It is important to know and be able to measure accurately the depth of char layers in such ablative materials in order to determine whether such materials meet required standards as well as determine safe operating limits for materials in the particular applications.

Known ablative materials include both electrically conductive and electrically nonconductive materials.

2. Description of the Prior Art

The prior art has turned to the use of radioisotope and the "make-wire" sensor techniques for determining char rate in ablative materials. The radioisotope technique comprises embedding radioisotopes in an ablative material at various predetermined depths. The isotopes are frequently enclosed in capsules or may be distributed throughout the ablative material in an impregnating technique. A counter is positioned at the rear surface of the ablative material and monitors total radiation as the char layer progresses through the material from a front surface opposite the rear surface. The isotopes or metal capsules containing the isotopes are selected to melt or decompose at some predetermined temperature which is ideally at the temperature of pyrolysis. The side opposite the counter is heated causing a zone of pyrolysis to migrate through the material toward the detector leaving a region of char in its wake. As the region containing the isotopes is encountered and melted or decomposed by pyrolysis, the total radiation level drops, decreasing the output signal from the counter or detector.

In a second technique, i.e., the "make-wire" sensor technique, a pair of conductors such as metal wires are embedded in the ablative material normal to the heated surface. The system operates by applying a potential voltage to the wires and monitoring the change in resistance between them through the ablator as the material is heated. This is usually done by installing a resistor in series with the wires and measuring the voltage across the resistor. Initially, prior to heating, the voltage across the resistor is low since the resistance of the ablative material in series with the resistor is high. As the char front or zone of pyrolysis passes through the material during heating, the conductivity of the ablator changes rapidly and the voltage across the resistor increases.

The use of radioisotopes has some advantages but many disadvantages most serious of which is that it does not actually measure the char position directly but it measures a predetermined temperature from which the char layer location is inferred. Although the char front for a particular material may be fairly well established by knowing the approximate pyrolysis temperature, there are variations. Moreover, even if the pyrolysis temperature for a particular material is well known, it may be difficult to use the radioisotope technique for other materials to be investigated which have significantly different pyrolysis temperatures. One must change the particular isotope used for different ablative materials. In addition, the use of radioisotopes creates personal hazard and shelf life problems since the half life of each isotope must be taken into consideration during storage and prior to use.

The "make-wire" sensor is independent of temperature and depends on the change in electrical conductivity of the ablative material as a zone of pyrolysis passes a given location. However, this technique cannot be used for ablative material which is electrically conductive since it would always be short-circuited through the virgin material. Similarly a break wire sensor would never become open circuited for the same reason.

SUMMARY OF THE INVENTION

According to the invention the char front and char rate in an electrically conductive ablative material having a first surface and a second surface is determined by embedding at least one ultrasonic sound reflector at a predetermined depth in the ablative material between first and second surfaces. Ultrasonic sound waves are then passed into the material through the first surface and the reflection of the sound waves through the first surface is monitored by a sensor, whereby if the waves are reflected by the reflector it is known the char front has not passed from the second surface beyond the reflector and conversely if the sound waves are not reflected, it is known that the char front has passed the particular reflectors or reflector monitored.

The char layer sensor preferably comprises an ablator defining parallel front and rear surfaces with reflectors embedded at predetermined depths in the ablator. Preferably an ultrasonic sensor and generator is positioned adjacent the rear surface associated with an oscilloscope or high speed chart recorder and/or necessary associated electronics to record the rate of char in the ablator by measurement of sound reflection from the reflectors as char progresses. The reflectors are always a predetermined distance from the front and rear surfaces which need not be parallel although it is preferred that the reflectors be parallel to at least the rear surface.

It is a feature of this invention that char rate can be determined independent of temperature and measured directly. The ablator changes in porosity as it is charred and while being a good conductor of sound waves before charring, is an extremely poor conductor of sound waves after charring and dampens or obliterates reflection of sound from the reflector after charring. The invention does not have any shelf life limitations and is usable in a wide variety of ablative materials. Thus, while eliminating the primary disadvantages of the radioisotope techniques, the invention is capable of operation in electrically conductive as well as nonconductive ablators and the reflectors can be chosen so as not to upset ablation or char characteristics of the ablator.

BRIEF DESCRIPTION OF THE DRAWINGS

The above and other objects and features of the present invention will be better understood from the following specification when read in connection with the accompanying drawings in which:

FIG. 1 is a side view of the plug of ablative material semidiagrammatically indicating the associated structure of the present invention;

FIG. 2 is an end view thereof; and

FIG. 3 and 3a are oscilloscope presentations from an ultrasonic transducer generating sound waves and reflecting said waves through the ablative plug shown in FIG. 1.

DESCRIPTION OF PREFERRED EMBODIMENTS

With reference now to the drawings and more particularly FIG. 1, a system 10 is shown for measuring char rate and determining the occasion of a char front in an ablative material. The system 10 comprises a cylindrical plug of ablative material 11 in which are embedded ultrasonic sound reflectors 1—3 associated with an ultrasonic sensor or transducer 12 and an oscilloscope 13 interconnected with the ultrasonic sensor through associated electronics of the oscilloscope indicated diagrammatically at 14.

The plug 11 can comprise any of the known ablative materials preferably in virgin form. Preferably the means and method of this invention is used in conjunction with electrically conductive ablative material although electrically nonconductive material having sufficient density to conduct ultrasonic sound waves can also be employed. For example, ablative materials such as carbon type ultrasonic transmitting materials including graphite-phenolic materials such as Narmco 4028 can be used.

The plug 11 is preferably cylindrical having parallel front and rear surfaces 15 and 16, respectively, perpendicular to the axis of the cylinder. However, the ablative material can be in any form such as a sheet, cube or other form including irregular forms where the front and rear surfaces are irregular or nonparallel.

The reflectors 1—3 are embedded in the ablative material at predetermined distances from each other and from the front and rear surfaces, preferably parallel to the front and rear surfaces. Preferably the reflectors are thin metal discs such as stainless steel discs having a thickness preferably in the range of from 0.0001 to 0.010 inch and diameters from one-sixteenth to one-half inch. Preferably the thinnest possible discs are used to minimize heat disturbance in the ablative material. Although metals resistant to high temperatures such as stainless steel are preferred, any material which will withstand temperatures encountered in the "near" char region, i.e. 2000° F. and which has good sound reflecting properties can be used. The discs are preferably spaced at varying positions about the central axis of the cylinder as best shown in FIG. 2 so that uninterrupted reflection paths are provided from the rear surface to each disc.

The ultrasonic sensor 12, oscilloscope 13 and associated electronics 14 for measuring reflection from each disc can be conventional equipment. The oscilloscope can be linked with or replaced by conventional high speed chart recorders.

Turning now to the method of this invention, the ultrasonic sensor 12 is a transducer acting both as a transmitter and receiver in a pulse-echo mode of operation to transmit a pulse from the rear surface 16 toward the front surface 15 exposed to heat. The sound waves are intercepted by the thin metal discs embedded at precise predetermined locations (X1, X2 and X3) within the plug 11, and each disc reflects a portion of the input pulse back to the transducer. The pulse and echoes are presented on an oscilloscope display, and the scope presentation will be as shown in FIGS. 3 and 3a. As noted in FIG. 3, the time base can be calibrated directly in distance where the path of a beam which travels a total length to the front surface and return is 2L. All values can then be normalized to direct indications of distance as shown in the FIG.

As the structure 11 is heated, the char region led by the zone of pyrolysis progresses toward the rear surface from the front surface until it passes disc 1. At this point the material to the rear of disc 1 beyond the char front is still in the virgin state while all of the material forward of it is charred. Since chars are typically porous, the ultrasonic waves are readily absorbed and no signal returns from disc 1. The indication of the passage of the zone of pyrolysis past a disc is the absence of the reflected signal from the disc. Since all virgin ablators which are electrically conductive are capable of transmitting sonic pulses in the virgin state but are sonic absorbers in the charred condition, the method of this invention can be used substantially universally.

The char boundary or front is specified as the region, one side of which is virgin or unadulterated ablator while the other side is modified through heating. The zone wherein one condition transists to the other is called the zone of pyrolysis which is a zone of degradation where the resinous material decomposes giving off gases which percolate through the charred portion absorbing heat in the process. The residue is a porous structure, typically carbon rich which serves as an extremely good sonic muffler.

In a specific example of this invention, a plug ablator of Narmco 4028 graphite pressed phenolic having a length of 1 inch and a diameter of 1 inch is used. Holes are drilled from the rear surface 16 to position metal discs having diameters of five thirty-seconds inch, one-eighth inch, three thirty-seconds inch and thicknesses of 0.0005 inch at positions 1, 2 and 3 with the plug holes filled in with ablative material. An ultrasonic system such as an ultrasonoscope model MK-2C and associated transducer is employed to generate sound waves at a frequency of 2.25 m.c.p.s. The discs 1, 2 and 3 are spaced at distances of X1=¼ inch, X2=⅜ inch and X3=⅝ inch.

When the front surface 15 is exposed to a temperature of 5000° F., the oscilloscope interconnected with the transducer shows the graphs indicated at FIGS. 3 and 3a which determines the char boundary as the material is charred and zone of pyrolysis progresses. The reflection from the front surface can be observed until the onset of charring. Moreover, the rate of progression of the zone of pyrolysis is indicated so that the char rate can be determined.

While specific embodiments of this invention have been shown and described, it should be understood that many variations thereof are possible. For example the particular frequency of the sound wave generator preferably lies in the range of from 0.5 m.c.p.s. to 20 m.c.p.s. although other frequencies can be used. The number, depth and spacing of the discs or sound reflectors can vary greatly depending upon the particular application and materials used. The reflectors used can be of equal diameter and spaced equidistant apart. It is preferred to use progressively larger diameter reflectors starting with the smallest diameter closest to the rear surface in order to maximize reflection of sound waves from the reflectors more distant from the transducer. In some cases the reflectors can be nonparallel to each other. The embodiment shown can be used to detect a char front progressing parallel to the axis of the plug or unevenly from the front surface toward the rear surface as at an angle to the axis. In the latter case, two or more echoes may disappear substantially simultaneously. In all cases, the ablator used must be capable of transmitting ultrasonic sound and preferably is electrically conductive.

In view of the many variations possible, this invention is to be limited only by the spirit and scope of the appended claims.

I claim:

1. A method of determining char rate in an electrically conductive ablative material having a first surface and a second surface, said method comprising embedding a plurality of sound reflectors at predetermined depths in said ablative material between said first and second surfaces, exposing said second surface to a corrosive environment, passing ultrasonic sound waves into said material through said first surface and monitoring reflection of said sound waves from said reflectors through said first surface whereby if said waves are reflected by said reflectors it is known that the zone of pyrolysis has not passed said reflectors from said second surface and conversely if one or more of said reflectors do not reflect sound waves, it is known that the zone of pyrolysis has passed said one or more reflectors.

2. A method in accordance with the method of claim 1 wherein said sound waves are passed into said material at a frequency in the range of from 0.5 to 20 m.c.p.s.

3. A method in accordance with the method of claim 1 wherein said second surface is exposed to heat at a degrading temperature and said reflectors comprise a high temperature resistant metal.

4. A method in accordance with the method of claim 1 wherein said reflectors are embedded in positions substantially parallel to said first surface with unobstructed fields between each reflector and said first surface.

5. A char sensor for electrically conductive ablative materials comprising, a form of ablative material having a first surface and a second surface, a plurality of sound reflectors embedded at predetermined positions between said first and second surfaces.

6. A char sensor in accordance wit claim 5 wherein said reflectors comprise metal.

7. A char sensor in accordance with claim 5 wherein an ultrasonic sound sensor is positioned at said first surface.

8. A char sensor in accordance with claim 6 wherein said reflectors have different diameters.

9. A char sensor in accordance with claim 8 wherein said reflectors each have a thickness in the range of from 0.0001 to 0.010 inch.